United States Patent
Danielsson et al.

[11] Patent Number: 5,820,318
[45] Date of Patent: Oct. 13, 1998

[54] DRILLING TOOL

[75] Inventors: Ake Danielsson, Gävle; Torsten Blomberg, Sandviken, both of Sweden

[73] Assignee: Sandvik AB, Sandviken, Sweden

[21] Appl. No.: 793,122

[22] PCT Filed: Sep. 11, 1995

[86] PCT No.: PCT/SE95/01016

§ 371 Date: Mar. 20, 1997

§ 102(e) Date: Mar. 20, 1997

[87] PCT Pub. No.: WO96/08334

PCT Pub. Date: Mar. 21, 1996

[30] Foreign Application Priority Data

Sep. 12, 1994 [SE] Sweden .................................. 9403025

[51] Int. Cl.$^6$ .................................................. B23B 51/00
[52] U.S. Cl. .......................... 408/191; 408/192; 408/224; 408/713
[58] Field of Search .......................... 407/45, 46; 408/83, 408/186, 191, 192, 713, 223, 224, 227, 231, 233, 190

[56] References Cited

U.S. PATENT DOCUMENTS 3,726,352  4/1973  Olov Roos .
4,100,983  7/1978  Hermann et al. .
4,133,399  1/1979  Herrmann .
4,165,947  8/1979  Smids .
4,225,274  9/1980  Katz .

FOREIGN PATENT DOCUMENTS 829 396    1/1952   Germany .
1 221 526  3/1961   Germany .
25 22 565  5/1975   Germany .
25 56 977  12/1975  Germany .
1726154    4/1992   United Kingdom .

Primary Examiner—Daniel W. Howell
Attorney, Agent, or Firm—Burns, Doane, Swecker & Mathis, L.L.P.

[57] ABSTRACT

A drilling tool for drilling in metals has in its front part cutting insert-carrying cartridges, for instance 3, 5 or 7 in number. The peripheral cartridge (6) carries a peripheral cutting insert (7). This peripheral cartridge is fastened in the drill by a locking screw (16) that extends in a slot (17) in the drillhead. Radially inside of the peripheral cartridge is a wedge (15) which can be displaced axially and thereby regulate the radial position of the peripheral cartridge and cutting insert and, thereby, the cutting diameter. When the desired radial adjustment has been attained, the peripheral cutting insert is fixed by the locking screw (16). In this way, a very exact adjustment of the cutting diameter is obtained.

10 Claims, 3 Drawing Sheets

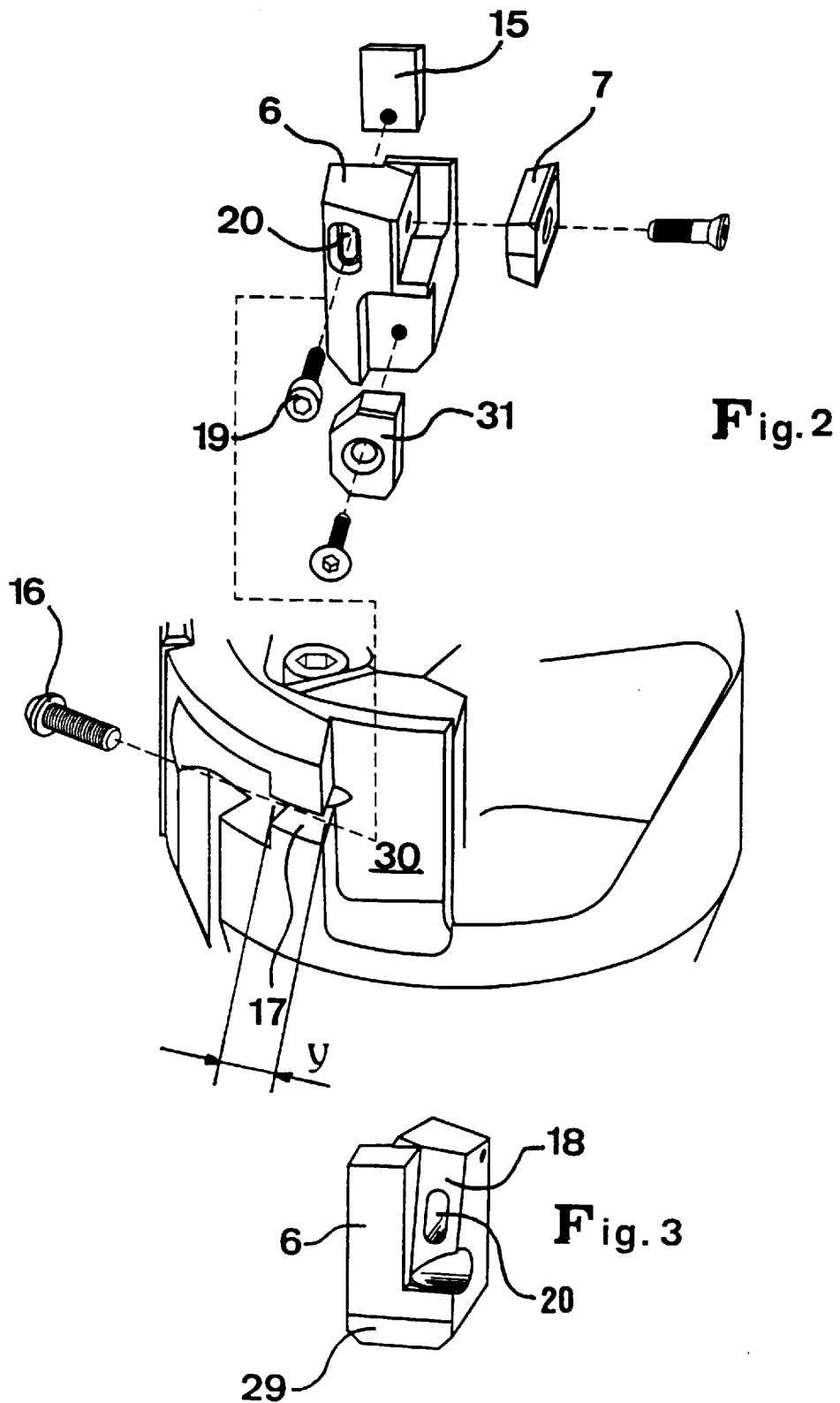

DRILLING TOOL

The present invention relates to a drilling tool in first hand intended for drilling in metals, comprising a peripheral cutting insert mounted in an adjustable cartridge for adjusting the cutting diameter:, in accordance with claim 1.

For drills it is known to use cutting inserts of cemented carbide which are fastened on the drill by mechanical clamping arrangements. In accordance with a number of known constructions, the cutting inserts are first mounted in cartridges, which thereafter are mechanically and reversibly fastened in the drill. For instance, in U.S. Pat. No. 3,726,352 (& SE-C-347 673) such a construction is described, according to which the cutting diameter is adjusted by positioning the peripheral cartridge by means of two set screws. When the desired diameter has been attained, the cartridge is fixed by a special locking screw. Although this construction has functioned satisfactorily, experience over the years has revealed several inconveniences. The use of two set screws produces inaccuracies in the cutting diameter. Further, the range of adjustment is very narrow, more precisely in the order of magnitude of up to 0,1 mm. This depends on one hand on the fact that the locking screw is accomodated in a bored-up hole in the drill, the play between the wall of said hole and the locking screw determining the radial adjustment range of the cartridge, and on the other hand that it is not possible to co-adjust the support pads of the drill in relation with the peripheral cutting insert. A further disadvantage of this construction is that it is necessary to loosen the locking screw completely when it is desired to take away the cartridge from the drillhead.

A primary object of the present invention is to provide a drilling tool that makes possible a safer, simpler and more accurate adjustment of the cutting diameter than hitherto known drilling tools do.

A second object of the present invention is to simplify the detachment of the cartridges.

These and further objects have been attained by forming the peripheral cartridge of the drilling tool with a slot and a wedge in accordance with the characterizing clause of claim 1.

For illustrative but non-limiting purposes, the invention will now be further described with reference to the appended drawings, which show a preferred embodiment of the invention.

FIG. 2 shows an exploded view of the peripheral insert seat of a drilling tool according to FIG. 1.

FIG. 3 shows a perspective view of the peripheral cartridge obliquely from above, as seen towards the radially inner side.

Figure 1:
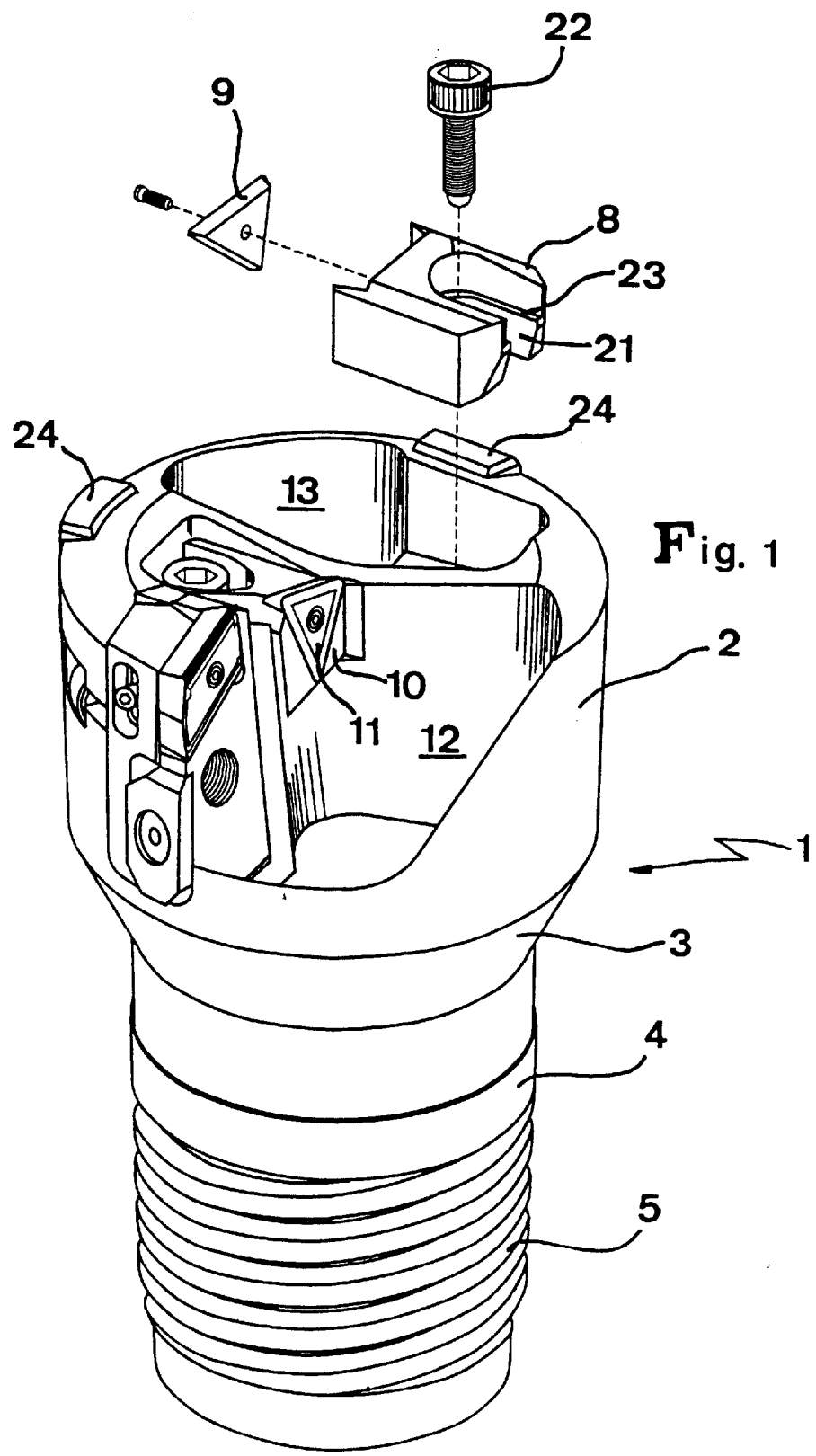
FIG. 1 shows a drilling tool according to the invention in a perspective view obliquely from above, one cartridge being shown in an exploded view.

In FIG. 1 a drilling tool according to the invention is generally designated by reference numeral 1. Suitably, the drilling tool is of ejector type but may advantageously be used generally at so called BTA-drilling. It comprises a crown or drillhead 2, a dimension adapter 3 and a shaft part 4. This shaft part is provided with an external thread 5 which is intended to be screwed into an outer holding tube (not shown) in a way known per se.

The illustrated drilling tool is equipped with three insert-carrying cartridges: a peripheral cartridge 6 with a peripheral cutting insert 7, an intermediate cartridge 8 with an intermediate cutting insert 9 and a central cartridge 10 with a central cutting insert 11. The peripheral cutting insert 7 produces the diameter in the hole of the machined workpiece. The adjacent central cutting insert 11 overlaps the central axis of the drill since no remaining core is desired. At rotation, the orbit of the cutting edge of the intermediate cutting insert 9 overlaps with the cutting edges of both the peripheral and the central cutting insert in order to obtain a continuous cutting line from the central axis to the periphery.

The number of cutting inserts in the drilling tool may be larger or smaller than three. Thus, the drilling tool may for instance be made with 4 to 9 cutting inserts, an uneven number of cutting inserts being preferred when the drill comprises two support pads. It has for instance been found that the number three is a good compromise between complicity, useful life and balancing for cutting diameters between 20 and 105 mm.

Figure 4:
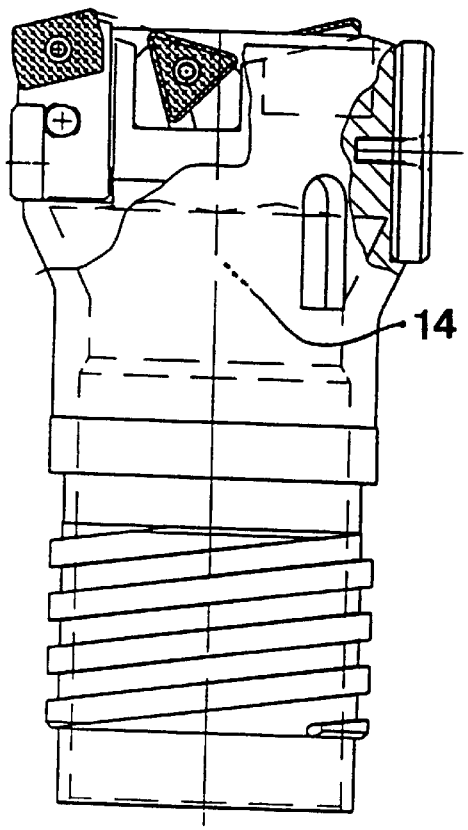
FIG. 4 shows a drilling tool according to the invention in a side view, partly in cross-section.
Figure 6:
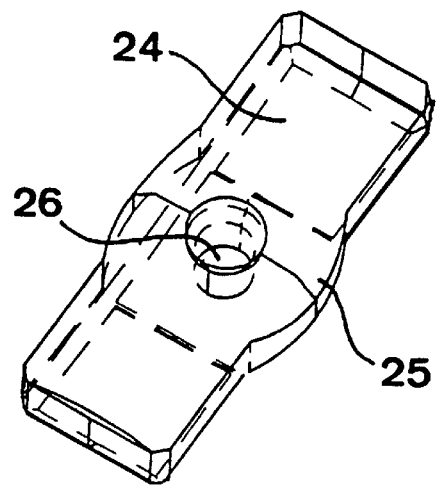
FIG. 6 shows a support pad which suitably is included in the drilling tool according to the invention.

Two chip flutes open to the top side of the drill: one common, larger chip flute 12 for the peripheral and central cutting inserts, and one somewhat smaller chip flute 13 for the intermediate cutting insert. The lower, opposite ends of these chip flutes preferably open into a turned-up inner chip space 14 (see FIG. 4) which has the form of a frustocone with the bottom surface turned upwards towards the top side of the drill.

Figure 5:
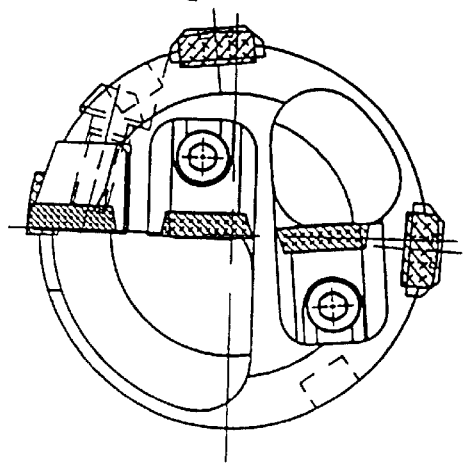
FIG. 5 shows a top view of the drilling tool according to FIG. 4.

According to the present invention, the peripheral cartridge 6, and thereby the operative cutting edge of the peripheral cutting insert 7, is radially adjustable by means of a wedge 15, the locking screw 16 of the cartridge being accomodated in a slot 17. Contrary to a cylindrical hole, this slot has two essential advantages: on one hand, the locking screw 16 may be moved radially in the slot when adjusting the cutting diameter, and on the other hand the whole cartridge may be removed from the drilling tool by simply turning or rotating the locking screw 16 through only a few revolutions (i.e., the locking screw need not be completely removed). In order to further secure the peripheral cartridge against centrifugal forces, the slot 17 may be shaped in such a way that its length y increases radially outwardly. In this way, the peripheral cartridge cannot be flung radially outwards once the locking screw 16 has been tightened. Further, the locking screw 16 is preferrably angled radially inwardly relative to the peripheral tangent of the drilling tool, as may be seen in FIG. 5, to permit a distinct abutment between the underside of the screw's head and the corresponding abutment surface above and underneath the slot opening, respectively.

The wedge 15, which is essential for the present invention, has a thickness that tapers in a narrowing manner axially downwards. It abuts against the axially oblique, radially inwardly directed slide abutment surface 18 (see FIG. 3), which suitably is inclined between 3° and 25° relative to the drill's central axis or axis of rotation. The wedge is screwed upon the cartridge by a screw 19 which is inserted through a hole 20 in the cartridge. The hole 20 is elongated in axial direction in order to enable an axial displacement of the wedge and, thereby, a radial fine adjustment of the peripheral cutting insert. The axial angle of surface 18 is substantially equally large as the angle between the two main surfaces of the wedge 15, so that the side of the wedge that lies against the cartridge seat 30 is substantially situated in an axial plane, like the bottom surface of the cartridge seat. When the desired cutting diameter has been attained, the peripheral cartridge is fixed in that position by the locking screw 16. The threaded hole for the locking screw 16 in the cartridge may either be blind or through.

Preferably, the radially inner side of the peripheral cartridge is at its lower part formed with a planar abutment surface 29, which at least to some extent always rests against a corresponding surface part in the drill's cartridge seat 30. Hence, at a positioning of the peripheral cutting edge, the cartridge is tilted around a point or line at the lower part of the cartridge. This line will normally be the upper or lower longitudinal edge line of the abutment surface 29.

According to a preferred embodiment of the present invention, also the other cartridges, i.e., in this case the intermediate and central cartridges, are shaped with slots instead of through holes, each intended to accomodate a locking screw. Thus, as may be seen in FIG. 1, the intermediate cartridge 8 is provided with a slot 21, through which extends the locking screw 22. The slot has a shoulder 23 against which the bottom surface of the locking screw's head rests. Starting off from the opening of the slot, this shoulder is inclined axially downwardly in order to lock the cartridge tangentially when the locking screw is tightened. The central cartridge is formed in a corresponding way.

In order to support and guide the drill in the drillhole, the drill is provided with two support pads 24 of cemented carbide. The peripheral cartridge 6 is also provided with a supporting shim 31 of a suitable material, such as bakelite. According to a preferred embodiment, the support pads 24 have a substantially parallelepiped basic shape with a rectangular plane view. Preferably, they are provided with two wing-shaped outgrowths 25, one at each longitudinal side. These outgrowths have substantially the shape of two circle segments, which basically constitute each other's reflected images, and whose outer contour essentially corresponds to a circle line. Their extension suitably constitutes between ⅕ and ⅗ of the total length of the longside, preferably between ¼ and the half. The radially outer side 17 of the support pads is somewhat rounded to abut against the drilled hole in the workpiece. Further, the support pad shows a through central hole 18 for the fixing of the support pad in the drill hole by a suitable locking screw.

Figure 7:
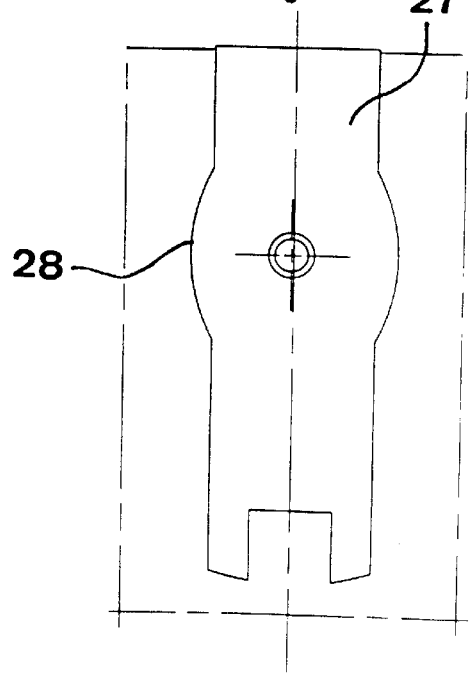
FIG. 7 shows a support pad seat in a drilling tool according to the invention.

FIG. 7 shows a seat 27 for accomodating the support pad. The seat 27 has a substantially plane bottom. The two axial delimitations have two bulging portions 28, whose shape basically corresponds to the geometrical form of the outgrowths 25. In this way, the support pad may be turned half a revolution if one of the shortends has been damaged, since the shortends do not have to function as abutment surfaces. Further, by means of underlying shim layers of differing thicknesses, different diameters may easily be adjusted, depending upon which cutting diameter has been set for the peripheral cutting insert. Then these shim layers have a plane view that substantially corresponds to the support pad and are laid under the support pad as distance elements. Moreover, the entire support pad seat 27 can be produced by one single end mill.

The construction according to the invention has brought a number of advantages in comparison with previously known constructions. Thus, a very simple as well as very safe adjustment of the cutting diameter has been attained. Inter alia, this has been accomplished by the fact that a wedge with a screw gives a stiff construction, since the contact surface is large, and thereby, a more accurate adjustment. Furthermore, the adjustment is simplified by the fact that a larger displacement axially results in a small diametrical displacement. Moreover, the peripheral cartridge can be detached in a very simple way.

It is claimed:

1. Drilling tool comprising a peripheral cartridge that carries a peripheral cutting insert which determines the cutting diameter, wherein on the radially inner side of the peripheral cartridge is arranged a wedge which can be displaced axially and thereby move the peripheral cartridge radially in order to adjust the cutting diameter, and in that the cartridge is fixed in the desired position by a locking screw which extends in an open slot in the drilling tool and is screwed into a threaded hole in the peripheral cartridge, the slot being angled relative to the radius of the tool and increasing in length radially outwards in order to secure the peripheral cartridge against centrifugal forces.

2. Drilling tool according to claim 1, wherein it comprises between one and seven insert-carrying cartridges.

3. Drilling tool according to claim 1 wherein, all insert-carrying cartridges except the peripheral cartridge are provided with an open slot, through which a locking screw is threaded.

4. Drilling tool according to claim 1, wherein the wedge is fastened by a screw that extends in an axially elongated hole in the peripheral cartridge.

5. Drilling tool according to claim 1, wherein the wedge rests upon an axially inclined slide abutment surface on the radially inner side of the peripheral cartridge, the wedge angle of said surface and the wedge being so adjusted that the radially inner side of the wedge is substantially parallel to an axial extension of the tool.

6. Drilling tool according to claim 1, wherein one or several support pads are arranged around the periphery of the drilling tool in order to support and guide the drill in the drillhole.

7. Drilling tool according to claim 6, wherein each support pad has a parallelepiped basic shape with a rectangular plane view, there being a wing-formed outgrowth on each longitudinal side, which outgrowth is arranged to fit into a corresponding bulging in a support pad seat provided in the drilling tool.

8. Drilling tool according to claim 1, wherein down at its bottom, the radially inner side of the peripheral cartridge is provided with a plane abutment surface, which is arranged to always rest upon the corresponding surface portion in the cartridge seat of the drill.

9. Drilling tool according to claim 1, wherein the radially outer side of the peripheral cartridge is provided with a support element in order to support and guide the drilling tool in the drillhole.

10. Drilling tool according to claim 1, wherein the drilling tool comprises between three and five insert-carrying cartridges.

* * * * *